Figure 1:
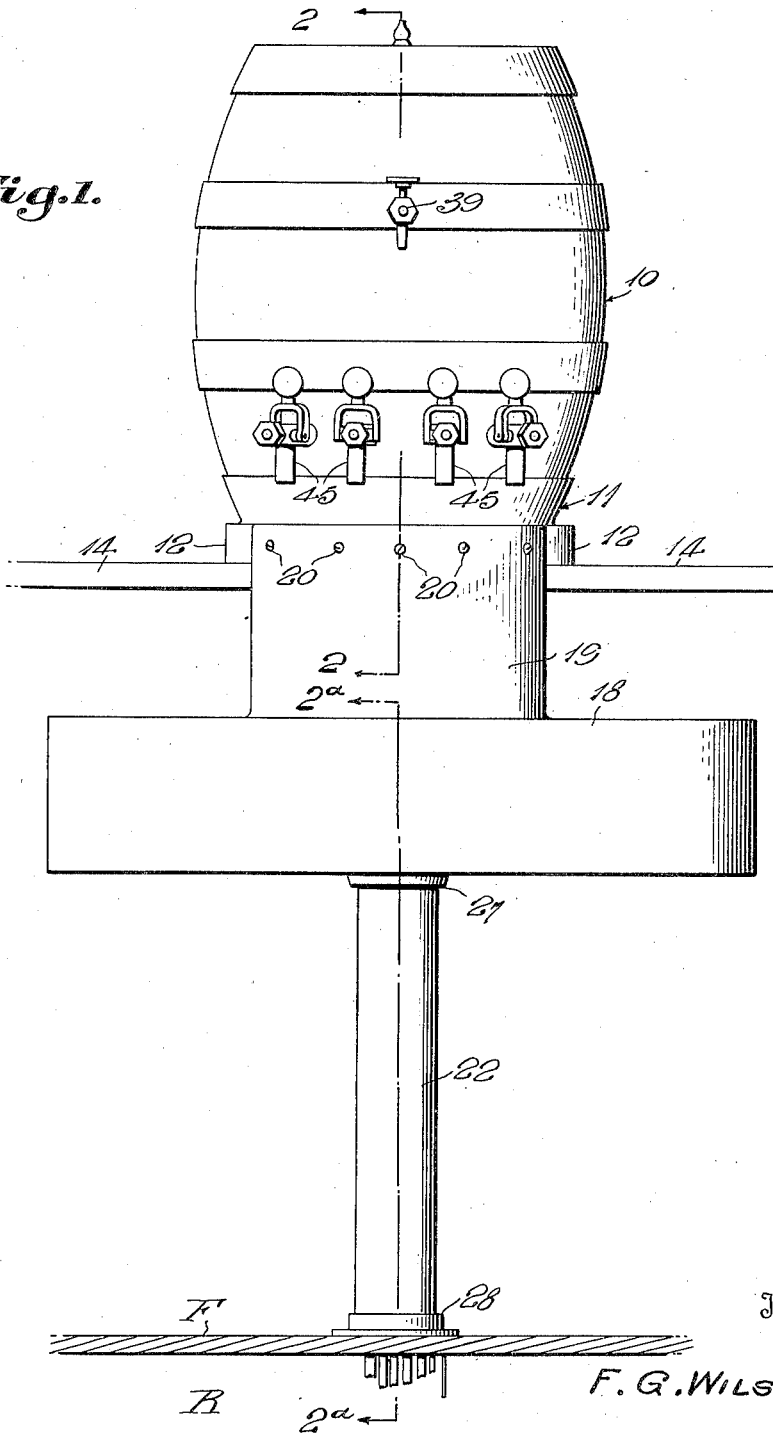

Jan. 17, 1939.  F. G. WILSON  2,144,005
BEVERAGE COOLING AND DISPENSING APPARATUS
Filed April 30, 1937  5 Sheets-Sheet 1

Inventor
F. G. WILSON

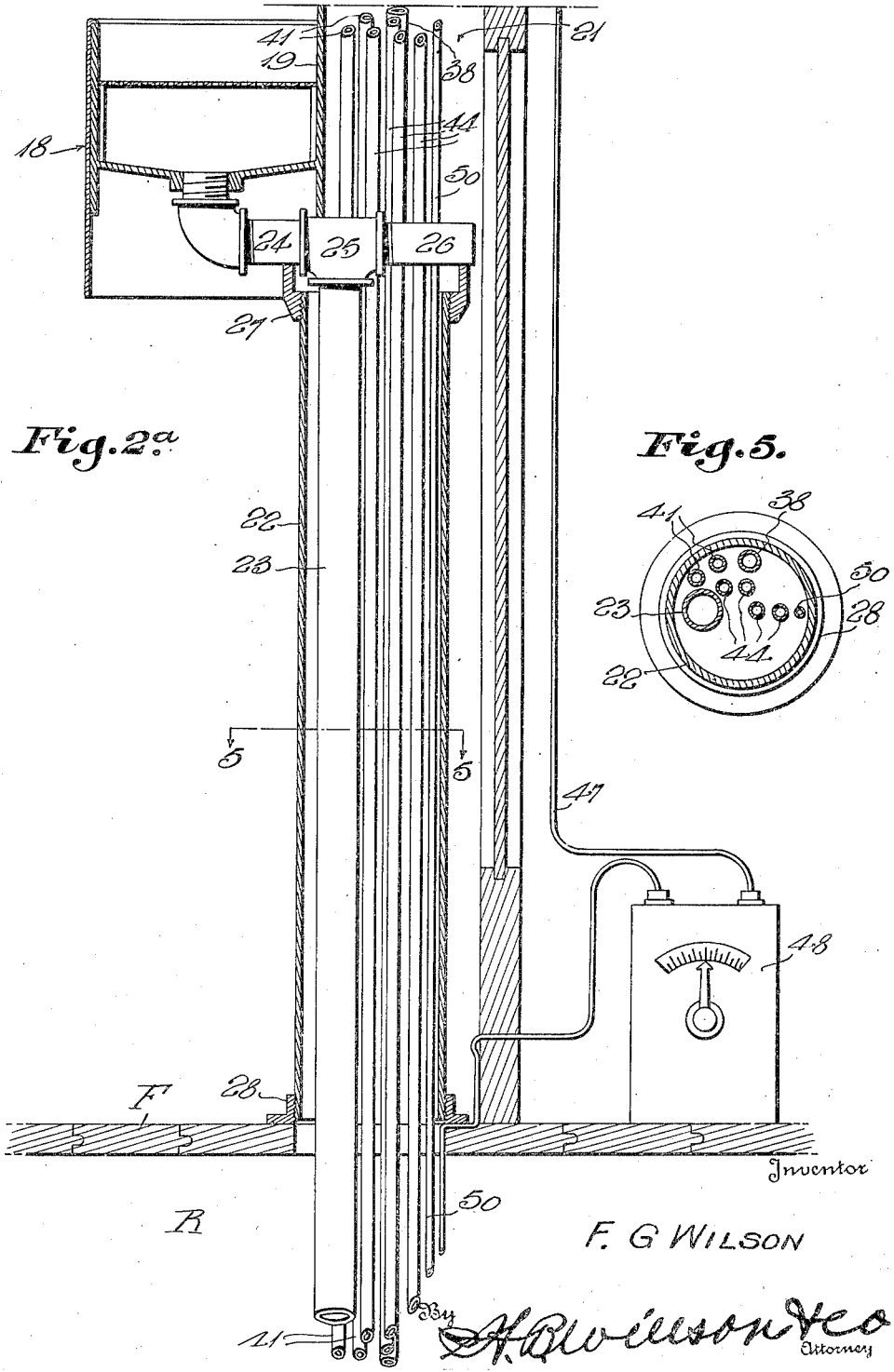

Jan. 17, 1939.　　　F. G. WILSON　　　2,144,005
BEVERAGE COOLING AND DISPENSING APPARATUS
Filed April 30, 1937　　　5 Sheets-Sheet 4
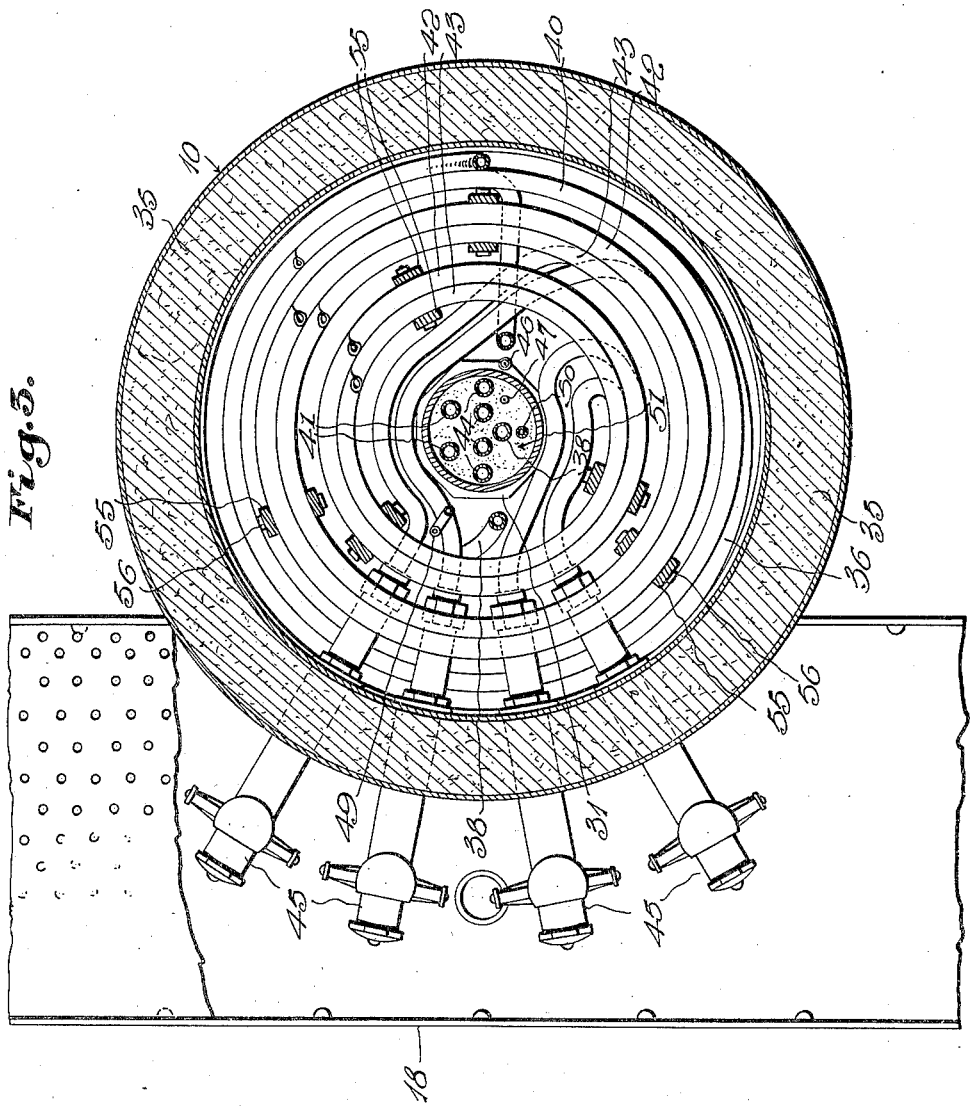
Inventor
F. G. WILSON
By H. B. Wilson & Co.
Attorneys Jan. 17, 1939.  F. G. WILSON  2,144,005
BEVERAGE COOLING AND DISPENSING APPARATUS
Filed April 30, 1937   5 Sheets-Sheet 5

Inventor
F. G. WILSON
By H. A. Wilson Yeo
Attorneys

Patented Jan. 17, 1939

2,144,005

UNITED STATES PATENT OFFICE 2,144,005

BEVERAGE COOLING AND DISPENSING APPARATUS

Fred Gerard Wilson, Brooklyn, N. Y.

Application April 30, 1937, Serial No. 140,016

20 Claims. (Cl. 225—1)

The invention relates to a cooler and dispenser for beer or other beverages, designed primarily for use on a restaurant counter, or bar (hereinafter termed a counter) but usable also at any other appropriate place.

In the form of construction herein disclosed, the apparatus includes a refrigerating container to rest upon and project beyond one edge of the counter, a sink for disposition at one side of said counter, and beverage-cooling coils within said container having discharge faucets over said sink, and one object of the invention is to make novel provision whereby said sink coacts with a tubular post, containing the sink drain pipe, in supporting the portion of the container which projects beyond the counter, overcoming any danger of said container being toppled over.

A further object is to make novel provision whereby the aforesaid tubular post and a wall of the sink obscure the beverage-conducting and any other lines extending to the container from a basement or other room.

A still further aim is to make novel provision whereby all lines necessarily entering the container, do so through a single stand-pipe therein, necessitating only one tight connection with the container bottom to prevent leakage, said standpipe extending above the level of the refrigerating liquid (preferably a so-called water bath) used in the container and being air-tightly sealed around said lines.

Yet another aim is to make novel provision for gradually cooling the beverage, this being of particular advantage with yeast-containing beverages, such as beer, for if such beverages be too suddenly chilled, they are impaired.

A further object is to provide a cooler which is well adapted for the use of electrical or other mechanical refrigeration, although not necessarily restricted thereto.

Yet another object is to provide a simple and inexpensive, yet an effective means for supporting the beverage-cooling coils.

The provision of a cooler which may be easily and inexpensively manufactured and installed, sold at a fair price, and economically operated, and one which will be attractive and efficient, is still another aim of the invention.

With the foregoing and minor objects in view, the invention resides in the novel subject matter hereinafter described and claimed, description being accomplished by reference to the accompanying drawings.

Fig. 1 is an elevation showing a cooler and dispenser constructed in accordance with the invention and supported in operative position.

Figure 2:
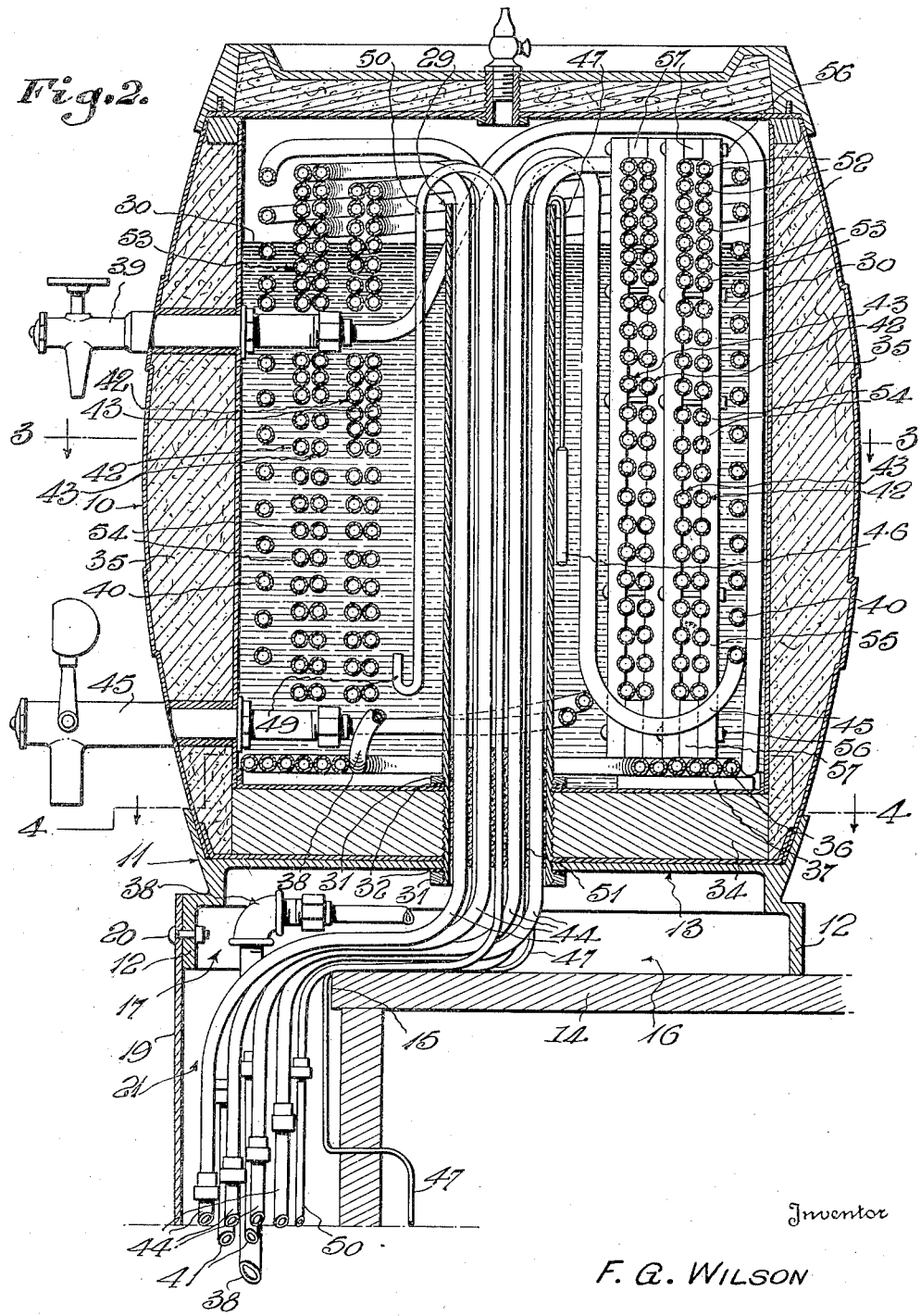

Figs. 2 and 2a are vertical sectional views on lines 2—2 and 2a—2a respectively of Fig. 1, said figures jointly disclosing a sectional view through the complete apparatus.

Figure 4:
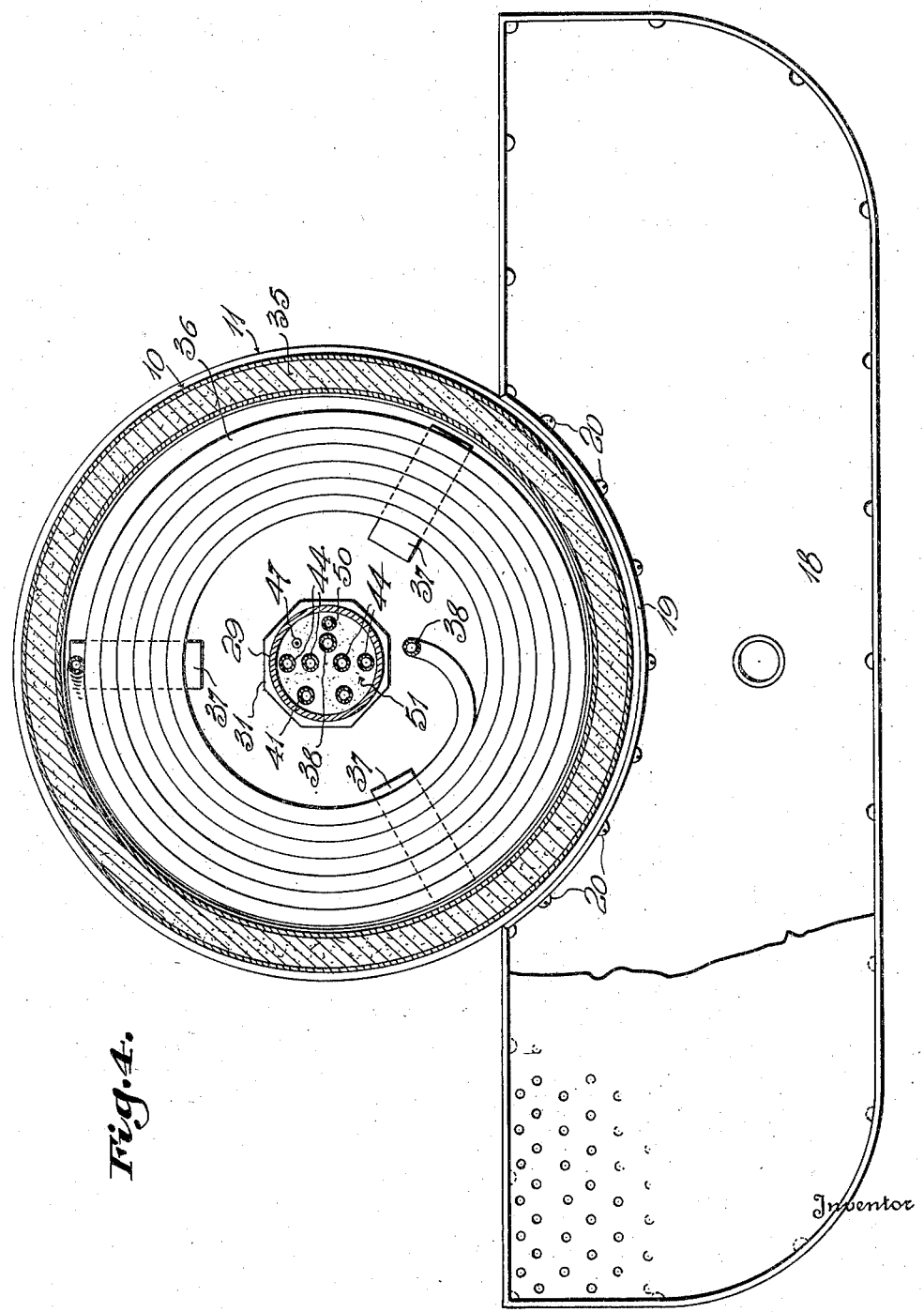

Figs. 3 and 4 are horizontal sectional views on lines 3—3 and 4—4 respectively of Fig. 2.

Fig. 5 is a detail horizontal section on line 5—5 of Fig. 2a.

A preferred construction has been shown and will be specifically described, with the understanding however, that variations may be made within the scope of the invention as claimed.

A container 10 is provided, preferably of barrel shape, said container having a base 11 provided with an annular side wall 12 which projects downwardly beyond the container bottom 13, said wall 12 being adapted to rest upon a counter 14 and to project beyond one edge 15 of said counter, providing space 16 between said container bottom 13 and said counter 14, and providing space 17 between the inner side of said wall 12 and said edge 15 of the counter 14.

A sink 18 is provied, said sink having an upstanding wall 19 disposed at one side of the counter 14. The upper end of said wall 19 is secured by bolts or the like 20 to the portion of the base wall 12 which projects beyond the counter 14, said wall 19 being of a shape, as viewed from above, corresponding to the shape of the portion of the base wall 12 with which said wall 19 contacts (see Fig. 4). Thus, a space 21 (Fig. 2) is provided between the wall 19 and the edge 15 of the counter 14.

A tubular post 22 is supported by the floor F and supports the sink 18, said tubular post 22 containing the major vertical portion of the drain pipe 23 leading from said sink. In addition to containing this portion of the drain pipe and obscuring it from view, the tubular post 22 coacts with the sink 18 whose wall 19 is rigidly secured to the base wall 12 of the container 10, in solidly supporting the portion of said container which projects beyond the counter 14, overcoming any liability of said container being toppled over from said counter. The tubular post 22 also acts as housing means for a number of lines extending to the cooling and refrigerating coils within the container 10, as hereinafter described, obscuring all of said lines from view between the floor and the sink. By constructing the post 22 from a metal which may be kept shiny, or by plating or otherwise covering it with such metal, and by doing likewise with the sink 18, the entire apparatus will present a very attractive appearance, particularly when the container 10 is properly finished and the various faucets of attractive design.

In the present showing, the drain pipe 23 for the sink 18 is provided with a minor horizontal upper end portion 24 formed in part by a T 25, said horizontal portion resting upon the post 22 and directly supporting the sink wall 19 to transmit weight from said wall to said post. The upper end of the sink drain pipe is also preferably provided with a lateral projection 26 in alinement with the portion 24 and also resting the post 22. The upper end of this post is provided with a vertically adjustable collar or terminal 27 which may be adjusted as required to secure solid contact with the drain pipe portion 24 and the projection 26. The pipe is also provided with a base flange 28 resting upon the floor F and if necessary when installing, this flange may be vertically adjusted to raise or lower the post 22, as occasion may require.

A central vertical stand-pipe 29 passes through the container bottom 13 and extends above the highest level of the water-bath 30, a fluid-tight connection between said bottom 13 and stand-pipe 29 being attained by the use of appropriate nuts 31 and gaskets 32, one gasket and nut being disposed upon the top of the bottom 13 and the others against the bottom thereof. This bottom 13 is preferably of double-walled construction containing suitable insulation and also containing a wooden block 34 which prevents said bottom from crushing either under the weight of the hereinafter described coils, or under the action of the nuts 31, when tightening the latter. The side wall of the container 10 is also of double-wall construction, the space between the inner and outer walls either containing an appropriate heat-insulating material 35 or constituting a vacuum or dead air space.

A horizontal spiral water-cooling coil 36 is supported by horizontal blocks or the like 37 resting upon the container bottom, and a water-conducting line 38 extends to one end of said coil 36, while a faucet 39 disposed over the sink 18, is suitably connected with the other end of said coil. Within the container, above the coil 36 is a refrigerant coil 40 and two pairs of beverage-cooling coils all disposed in concentric relation, the outer coil of each pair of said beverage-cooling coils being denoted at 42 and the inner coil of said pair at 43. Beverage-conducting lines 44 extend to the coils 42 and 43 and these coils are provided with appropriate beverage-discharge faucets 45 disposed over the sink 18. Refrigerant circulating lines 41 extend to the ends of the coil 40 and connect with other portions of an appropriate refrigerating system (not shown). A controlling thermostat 46 for this system is disposed in the water bath 30 and is connected with the end of a tubular wire 47 leading to a temperature-controlling device 48. A water-agitating nozzle 49 is also located in the container 10 and an air line 50 extends to said nozzle.

All of the lines 44, 41, 38, and 50 extend from a basement or other subjacent room R, through the tubular post 22, through the space 21 between the sink wall 19 and the counter, through the space 17 between the base side wall 12 and the counter edge 15, through the space 16 between the container bottom 13 and the counter 14, and extend through the single stand-pipe 29 into the container 10. The tubular wire 47 also extends through the spaces 21, 17 and 16, and through the stand-pipe 29. An air-excluding seal 51 of appropriate cement, is provided in the stand-pipe 29 around the various lines and the like extending therethrough, preventing any warm air from entering the container 10 through said stand-pipe and preventing chilled air from leaving said container through said stand-pipe. The temperature created within the container which is of insulated form throughout, will thus remain more uniform, with less expense for refrigeration.

The greater part of each beverage-cooling coil 42, 43 is submerged in the liquid 30 but some of the uppermost convolutions 52 thereof, are above the liquid level, these convolutions being preferably in such close relation with each other that the lower side of any convolution contacts with the upper side of the next adjacent convolution. Similarly a number of the uppermost of the submerged convolutions 53 are so closely related that the lower side of each contacts with the upper side of the next adjacent, while the remainder of the submerged convolutions, a number of which are denoted at 54, are vertically spaced from each other. By disposing the convolutions 52 above the liquid level, they have relatively little cooling efficiency, the uppermost submerged convolutions 53 have greater cooling efficiency because of contact with the water bath 30, but due to their contact with each other, said convolutions 53 have less cooling efficiency than the spaced submerged convolutions 54, the latter being more nearly surrounded by the water bath than said convolutions 53. The beverage enters the coils 42 and 43 from the lines 44, at the upper ends of said coils and is gradually cooled as it flows downwardly in said coils, being initially cooled in the above-liquid convolutions 52, cooled somewhat more in the convolutions 53, and finally chilled to the required extent in the spaced convolutions 54. By thus gradually cooling the beverage during its passage through the coils, there is no danger of impairing it, whereas it might be seriously impaired, particularly if containing yeast, by too sudden chilling.

To economize in space, the outer periphery of each inner coil 43 is disposed in contact with the inner periphery of each adjacent coil 42, the coils being held with their convolutions related as above described, by vertical coil-supporting bars 55, there being a plurality of these bars in contact with the other periphery of each outer coil 42, and a similar plurality in contact with the inner periphery of each inner coil 43, the bars being notched to form seats engaging the convolutions and being secured together by radial bolts 56. Rectangular blocks 57 are preferably interposed between the ends of the adjacent bars 55 and some of the bolts 56 pass through said blocks. The lowermost of the blocks 57 and the lower ends of the bars 55 rest upon the water coil 36 and hold it solidly upon the spacing blocks 37.

It will be seen from the foregoing that novel and advantageous provision has been made for carrying out the objects of the invention, and while the details disclosed are preferably followed, variations may of course be made within the scope of the invention as claimed.

I claim:

1. In a beverage cooling and dispensing installation, a counter, a refrigerating container resting on said counter and projecting beyond one edge thereof, a sink having a vertical wall disposed at one side of said counter, the upper end of said sink wall being rigidly secured to said container, a tubular floor-supported post supporting said sink, whereby said sink and said tubular post coact in supporting the portion of the container which projects beyond said counter, said sink having a drain pipe which extends downwardly within said tubular post, and beverage-cooling means within said container having a faucet over said sink.

2. In a beverage cooling and dispensing installation, a counter, a refrigerating container resting on said counter and projecting beyond one edge thereof, a sink having a vertical wall disposed at one side of said counter, the upper end of said sink wall being rigidly secured to said container, a tubular floor-supported post supporting said sink, whereby said sink and said tubular post coact in supporting the portion of the container which projects beyond said counter, said sink having a drain pipe which extends downwardly within said tubular post, beverage cooling means within said container having a faucet over said sink, and a beverage conducting line extending upwardly through said tubular post, upwardly between said sink wall and said counter and into said container to said beverage-cooling means.

3. In a beverage cooling and dispensing installation, a counter, a refrigerating container resting on said counter and projecting beyond one edge thereof, a sink having a vertical wall disposed at one side of said counter, said sink wall being rigidly secured at its upper end to said container and being shaped to provide space between its inner side and said counter, a tubular floor-supported post supporting said sink, whereby said tubular post and sink coact in supporting the portion of the container which projects beyond said counter, said sink having a drain pipe extending downwardly within said tubular post, beverage-cooling means within said container having a faucet over said sink, and a beverage-conducting line extending upwardly within said tubular post, through the space between said sink wall and counter, and through the container bottom to said beverage-cooling means.

4. In a beverage cooling and dispensing installation, a counter, a refrigerating container over said counter, said container having an annular base side wall projecting downwardly beyond the container bottom and resting upon said counter to provide space between said container bottom and said counter, said base side wall projecting beyond one edge of said counter to provide space between the inner side of said base side wall and said counter, a sink having a vertical wall disposed at one side of said counter, said sink wall being rigidly secured at its upper end to said base side wall and being shaped to provide space between the inner side of said sink wall and said counter, a tubular floor-supported post supporting said sink, whereby said tubular post and sink coact in supporting the portion of the container which projects beyond said counter, said sink having a drain pipe extending downwardly within said tubular post, beverage cooling means within said container having a faucet over said sink, and a beverage conducting line extending upwardly within said tubular post, through the space between said sink wall and counter, through the space between said base side wall and counter, through the space between the container bottom and counter, and through said container bottom to said beverage-cooling means.

5. In a beverage cooling and dispensing installation, a counter, a refrigerating container over said counter, said container having an annular base side wall projecting downwardly beyond the container bottom and resting upon said counter to provide space between said container bottom and said counter, said base side wall projecting beyond one edge of said counter to provide space between the inner side of said base side wall and said counter, a sink having a vertical wall disposed at one side of said counter, said sink wall being rigidly secured at its upper end to said base side wall and being shaped to provide space between the inner side of said sink wall and said counter, a tubular floor-supported post supporting said sink, whereby said tubular post and sink coact in supporting the portion of the container which projects beyond said counter, said sink having a drain pipe extending downwardly within said tubular post, beverage-cooling means within said container having a faucet over said sink, a stand-pipe passing through the bottom of said container, said container being intended to contain a refrigerating liquid and said stand-pipe extending above the highest liquid level, and a beverage-conducting line extending upwardly within said tubular post, through the space between said sink wall and counter, through the space between said base side wall and counter, through the space between the container bottom and counter, and through said stand-pipe to said beverage-cooling means.

6. In a beverage cooling and dispensing installation, a counter, a refrigerating container over said counter, said container having an annular base side wall projecting downwardly beyond the container bottom and resting upon said counter to provide space between said container bottom and said counter, said base side wall projecting beyond one edge of said counter to provide space between the inner side of said base side wall and said counter, a sink having a vertical wall disposed at one side of said counter, said sink wall being rigidly secured at its upper end to said base side wall and being shaped to provide space between the inner side of said sink wall and said counter, a tubular floor-supported post supporting said sink, whereby said tubular post and sink coact in supporting the portion of the container which projects beyond said counter, said sink having a drain pipe extending downwardly within said tubular post, beverage cooling means within said container having a faucet over said sink, a stand-pipe passing through the bottom of said container, said container being intended to contain a refrigerating liquid and said stand-pipe extending above the highest liquid level, a beverage-conducting line extending upwardly within said tubular post, through the space between said sink wall and counter, through the space between said base side wall and counter, through the space between the container bottom and counter, and through said stand-pipe to said beverage-cooling means, and an air-tight seal in said stand-pipe around said beverage-conducting line.

7. In a beverage cooling and dispensing installation, a counter, a refrigerating container resting on said counter and projecting beyond one edge thereof, a sink having a vertical wall disposed at one side of said counter, the upper end of said sink wall being rigidly secured to said container, a drain pipe for said sink having a major vertical portion and a minor horizontal portion, the latter being connected to the upper end of said major portion and supporting said sink wall, a tubular floor-supported post through which said major drain pipe portion extends and upon which said horizontal drain pipe portion rests, whereby said tubular post, said horizontal drain pipe portion and said sink wall coact in supporting the portion of the container which projects beyond said counter, and beverage-cooling means within said container having a faucet over said sink.

8. In a beverage cooling and dispensing installation, a counter, a refrigerating container resting on said counter and projecting beyond one edge thereof, a sink having a vertical wall disposed at one side of said container, the upper end of said sink wall being rigidly secured to said container, a drain pipe for said sink having a major vertical portion and a minor horizontal portion, the latter being connected to the upper end of said major portion and supporting said sink wall, a tubular floor-supported post through which said major drain pipe portion extends, said tubular post being provided with at least one vertically adjustable terminal upon which said horizontal drain pipe portion rests, whereby said tubular post, said horizontal drain pipe portion and said sink wall coact in supporting the portion of the container which projects beyond said counter, and beverage-cooling means within said container having a faucet over said sink.

9. A structure as specified in claim 7; said drain pipe being provided with a rigid lateral projection also resting on said tubular post.

10. A structure as specified in claim 8; said drain pipe being provided with a rigid lateral projection also resting upon said adjustable terminal of said tubular post.

11. In a beverage cooling and dispensing apparatus, a cylindrical container for a liquid, a substantially central vertical stand-pipe passing through the bottom of said container and extending above the highest intended liquid level, a helical refrigerant coil disposed vertically within said container near and in substantially concentric relation with the side wall thereof, refrigerant circulating lines extending into said container through said stand-pipe and connected with said refrigerant coil, helical vertically disposed beverage-cooling coils between said stand-pipe and said refrigerant coil and in substantially concentric relation therewith, beverage-conducting lines extending into said container through said stand-pipe and connected with said beverage-cooling coils, and discharge faucets for said beverage-cooling coils.

12. In a beverage cooling and dispensing apparatus, a cylindrical container for a liquid, a substantially central vertical stand-pipe passing through the bottom of said container and extending above the highest intended liquid level, a helical refrigerant coil disposed vertically within said container near and in substantially concentric relation with the side wall thereof, refrigerant circulating lines extending into said container through said stand-pipe and connected with said refrigerant coil, helical vertically disposed beverage cooling coils between said stand-pipe and said refrigerant coil and in substantially concentric relation therewith, beverage-conducting lines extending into said container through said stand-pipe and connected with said beverage-cooling coils, an air-tight seal in said stand-pipe around said lines, and discharge faucets for said beverage-cooling coils.

13. A beverage refrigerating and dispensing apparatus comprising a container, a refrigerating liquid therein, a vertically disposed coil within said container, a beverage-conducting line connected to the upper end of said coil, and a faucet connected with the lower end of said coil, said coil having most of its convolutions submerged in said liquid but having a number of its convolutions above said liquid, a number of the uppermost submerged convolutions being in contact with each other and the remainder of said submerged convolutions being spaced apart, whereby the above-liquid convolutions have relatively little cooling efficiency, the submerged contacting convolutions have greater cooling efficiency than said above-liquid convolutions, and the submerged spaced convolutions have still greater cooling efficiency, resulting in gradual cooling of the beverage as it flows downwardly in said coil.

14. In a beverage cooling apparatus, a refrigerating container, at least two vertically disposed helical beverage-cooling coils within said container and disposed one within the other, the outer peripheries of the inner coil convolutions being in contact with the inner peripheries of the outer coil convolutions, outer vertical coil-supporting bars at the outer periphery of the outer coil and having seats engaging the convolutions thereof, inner vertical coil-supporting bars at the inner periphery of the inner coil and having seats engaging the convolutions thereof, and bolts passing through said outer and inner coil-supporting bars and extending between convolutions of said coils.

15. A structure as specified in claim 14; together with blocks disposed between the ends of said outer bars and the ends of said inner bars, and bolts passing through said bar ends and blocks.

16. In a beverage cooling and dispensing installation, a counter, a refrigerating container resting on said counter and projecting beyond one edge thereof, a sink having a vertical wall disposed at one side of said counter, the upper end of said sink wall being rigidly secured to said container, a tubular floor-supported post supporting said sink, whereby said sink and said tubular post coact in supporting the portion of the container which projects beyond said counter, beverage cooling means within said container having a faucet over said sink, and a beverage conducting line extending upwardly through said tubular post, upwardly between said sink wall and said counter and into said container to said beverage-cooling means.

17. In a beverage cooling and dispensing installation, a counter, a refrigerating container resting on said counter and projecting beyond one edge thereof, a sink having a vertical wall disposed at one side of said counter, said sink wall being rigidly secured at its upper end to said container and being shaped to provide space between its inner side and said counter, a tubular floor-supported post supporting said sink, whereby said tubular post and sink coact in supporting the portion of the container which projects beyond said counter, beverage-cooling means within said container having a faucet over said sink, and a beverage-conducting line extending upwardly within said tubular post, through the space between said sink wall and counter, and through the container bottom to said beverage-cooling means.

18. In a beverage cooling and dispensing installation, a counter, a refrigerating container over said counter, said container having an annular base side wall projecting downwardly beyond the container bottom and resting upon said counter to provide space between said container bottom and said counter, said base side wall projecting beyond one edge of said counter to provide space between the inner side of said base side wall and said counter, a sink having a vertical wall disposed at one side of said counter, said sink wall being rigidly secured at its upper end to said base side wall and being shaped to provide space between the inner side of said sink wall and said counter, a tubular floor-supported post supporting said sink, whereby said tubular post and sink coact in supporting the portion of the container which projects beyond said container, beverage-cooling means within said container having a faucet over said sink, and a beverage-conducting line extending upwardly within said tubular post, through the space between said sink and counter, through the space between said base side wall and counter, through the space between the container bottom and counter, and through said container bottom to said beverage-cooling means.

19. In a beverage cooling and dispensing installation, a counter, a refrigerating container over said counter, said container having an annular base side wall projecting downwardly beyond the container bottom and resting upon said counter to provide space between said container bottom and said counter, said base side wall projecting beyond one edge of said counter to provide space between the inner side of said base side wall and said counter, a sink having a vertical wall disposed at one side of said counter, said sink wall being rigidly secured at its upper end to said base side wall and being shaped to provide space between the inner side of said sink wall and said counter, a tubular floor-supported post supporting said sink, whereby said tubular post and sink coact in supporting the portion of the container which projects beyond said counter, beverage-cooling means within said container having a faucet over said sink, a stand-pipe passing through the bottom of said container, said container being intended to contain a refrigerating liquid and said stand-pipe extending above the highest liquid level, and a beverage-conducting line extending upwardly within said tubular post, through the space between said sink wall and counter, through the space between said base side wall and counter, through the space between the container bottom and counter, and through said stand-pipe to said beverage-cooling means.

20. In a beverage cooling and dispensing installation, a counter, a refrigerating container over said counter, said container having an annular base side wall projecting downwardly beyond the container bottom and resting upon said counter to provide space between said container bottom and said counter, said base side wall projecting beyond one edge of said counter to provide space between the inner side of said base side wall and said counter, a sink having a vertical wall disposed at one side of said counter, said sink wall being rigidly secured at its upper end to said base side wall and being shaped to provide space between the inner side of said sink wall and said counter, a tubular floor-supported post supporting said sink, whereby said tubular post and sink coact in supporting the portion of the container which projects beyond said counter, beverage-cooling means within said container having a faucet over said sink, a stand-pipe passing through the bottom of said container, said container being intended to contain a refrigerating liquid and said stand-pipe extending above the highest liquid level, a beverage-conducting line extending upwardly within said tubular post, through the space between said sink wall and counter, through the space between said base side wall and counter, through the space between the container bottom and counter, and through said stand-pipe to said beverage-cooling means, and an air-tight seal in said stand-pipe around said beverage-conducting line.

FRED GERARD WILSON.